(12) United States Patent
Rothschild et al.

(10) Patent No.: US 6,735,028 B1
(45) Date of Patent: May 11, 2004

(54) METHOD AND APPARATUS FOR INCREASING DATA STORAGE CAPACITY VIA PHASE AND AMPLITUDE MODULATION

(75) Inventors: Keith Alan Rothschild, North Wales, PA (US); John J. Ernandez, Sr., Chalfont, PA (US)

(73) Assignee: General Instrument Corp., Horsham, PA (US)

( * ) Notice: Subject to any disclaimer, the term of this patent is extended or adjusted under 35 U.S.C. 154(b) by 314 days.

(21) Appl. No.: 09/941,098

(22) Filed: Aug. 28, 2001

(51) Int. Cl.[7] .................................................. G11B 5/09
(52) U.S. Cl. ............................ 360/40; 360/32; 360/39
(58) Field of Search ............................... 360/40, 39, 32

(56) References Cited

U.S. PATENT DOCUMENTS 5,095,392 A * 3/1992 Shimazaki et al. ........... 360/40

* cited by examiner

Primary Examiner—David Hudspeth
Assistant Examiner—Dan I Davidson
(74) Attorney, Agent, or Firm—Steven L. Nichols; Ronald P. Kananen; Rader, Fishman & Grauer PLLC

(57) ABSTRACT

The capacity and realized data rate of a data storage medium is increased by storing multiple bits per symbol using digital modulation techniques. Both phase and amplitude modulation techniques can be applied so that each symbol includes two or more bits that are represented by in-phase and quadrature phase portions of the signal corresponding to the data on the medium.

46 Claims, 2 Drawing Sheets

METHOD AND APPARATUS FOR INCREASING DATA STORAGE CAPACITY VIA PHASE AND AMPLITUDE MODULATION

TECHNICAL FIELD

The present invention is related to data storage, and more particularly to a data storage method and apparatus incorporating phase and amplitude modulation techniques to increase data storage capacity.

BACKGROUND OF THE INVENTION

Increasing storage capabilities of a data storage medium while reducing the medium's size has been an ongoing challenge in the industry. The industry has addressed these issues by increasing the data densities of existing storage media.

The theoretical storage capacity limits for existing disk drives depends on how closely the disk can reliably store adjacent symbols. If too many symbols are stored in a limited space, they will start to interact and exhibit intersymbol interference, making it impossible to recover the data corresponding to the interfering symbols. Existing research has focused on finding media that inhibit intersymbol interference or allow bits to be packed more closely together before the effects of intersymbol interference cause the data to be unrecoverable.

Conventional data storage methods divide the medium into individual cells that represent one bit each and either reverse or maintain the magnetization direction of each cell. In double-frequency modulation, for example, a "1" is represented by a reversal of magnetization in a cell and a "0" is represented by the absence of a reversal. Viewed another way, the signal from the medium can be analyzed such that a phase shift of 180 degrees represents a "1" and the absence of a phase shift represents a "0".

Because each data symbol is represented only by one bit, the amount of data that can be stored on the hard drive is limited.

There is a need for a data storage method and system that increases the storage capacity of a magnetic based data storage system while inhibiting intersymbol interference caused by storing symbols too closely together.

SUMMARY OF THE INVENTION

Accordingly, the present invention is directed to an apparatus for writing data to a medium that can store a plurality of symbols, comprising: a data encoder that receives serial data as an input and converts the serial data to parallel data, a modulator that receives the parallel data from the data encoder, and a write head responsive to the modulator for writing at least two bits per symbol on the medium based on the parallel data.

The present invention is also directed to an apparatus for reading data from a medium having a plurality of symbols, wherein at least one of the symbols contains at least two bits per symbol, comprising: a read head that reads the symbols from the medium, a demodulator that converts the symbols into parallel data, and a data decoder that receives the parallel data as an input and converts the parallel data to serial data.

The invention is further directed to a method for writing data to a medium, comprising the acts of: converting serial data to parallel data and writing at least two bits per symbol on the medium based on the parallel data.

Additionally, the invention is directed to a method for reading data from a medium having a plurality of symbols, wherein at least a portion of the symbols contain at least two bits per symbol, comprising the acts of: reading the symbols from the medium, converting the symbols into parallel and converting the parallel data to serial data.

DETAILED DESCRIPTION OF THE EMBODIMENTS

Generally, the invention applies different data storage techniques to increase storage capacity rather than focusing on developing media having higher integrity. More particularly, the present invention applies modulation techniques developed in digital communication systems to increase data storage capacity.

Figure 1:
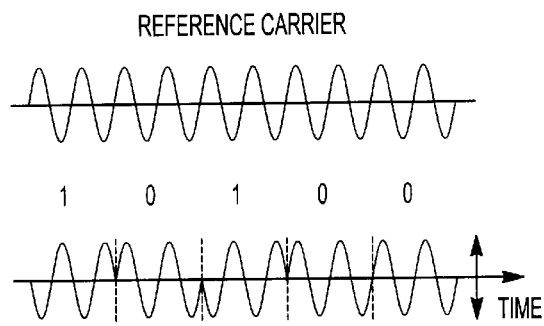
FIG. 1 illustrates a binary phase shift keying concept.

As noted above, symbols that are currently stored in hard drives are analyzed as if there are only two possible signal states where a phase shift of 180 degrees represents a "1" and the lack of a phase shift represents a "0". In the digital communication systems field, this model is similar to binary phase shift keying (bPSK), where only one of two possible signals can be transmitted during each signaling interval. An example of a signal undergoing binary phase shift keying is shown in FIG. 1. As can be seen in the Figure, the phase of the signal shifts 180 degrees with respect to a reference phase in the "1" state and remains unchanged with respect to the reference phase in the "0" state.

In a binary digital modulation system, only one of two possible signals can be transmitted during each signal interval. Because signals have both real and imaginary components, however, multi-phase shift keying (mPSK), and quadrature phase shift keying (qPSK) in particular, has been considered in the communications field as a way to transmit a greater amount of information in a smaller bandwidth. Quadrature phase shift keying considers the signal in both the real and imaginary domains rather than limiting its analysis to the real portion of the signal. Generally, the invention involves referring to the real portion of the signal as the "in-phase" portion and the imaginary portion of the signal as the "quadrature phase" portion.

Figure 2:
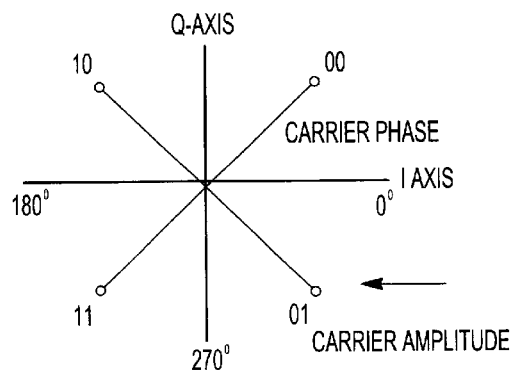
FIG. 2 is a map showing a relationship between multi-bit symbols and phases for a quadrature phase shift keying concept.
Figure 3:
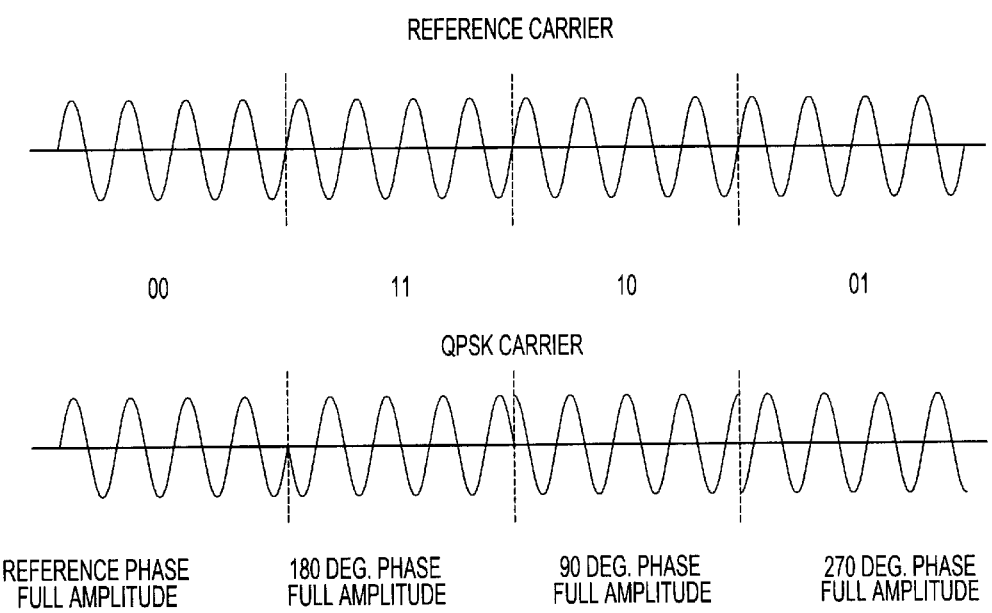
FIG. 3 illustrates waveforms generated by quadrature phase shift keying.

FIGS. 2 and 3 illustrate the qPSK concept, which is incorporated in one embodiment of the invention. In the communications field, quadrature phase shift keying doubles the information-carrying capacity of a digital modulator by independently modulating an in-phase signal portion and a quadrature phase signal portion that differ in phase by 90 degrees and that are generated by a single source. More particularly, the signal is separated into a real portion and an imaginary portion, which each have one of two different phase states. The real and imaginary portions are in turn individually modulated in one of two phase states to obtain four possible phase states or symbols, each symbol containing two bits, as illustrated in FIG. 2. For example, a two-bit symbol that contains no phase shift with respect-to the previous symbol can be represented as "00", a 90 degree phase shift as "01", a 180 degree phase shift as "11" and a−90 degree phase shift as "10" as shown in FIG. 2. FIG. 3 illustrates an example of qPSK carrier waveforms compared to a reference carrier waveform having a constant amplitude, frequency and phase.

Because the qPSK technique described above, and mPSK techniques in general, reduce the angular spacing between phases (from 180 degrees to 90 degrees in the above example), the invention requires an increase in the signal-to-noise ratio and introduces more bits per symbol, thereby increasing the storage capacity of a data recording medium without having to modify the medium's integrity to store more symbols closer together.

Figure 4:
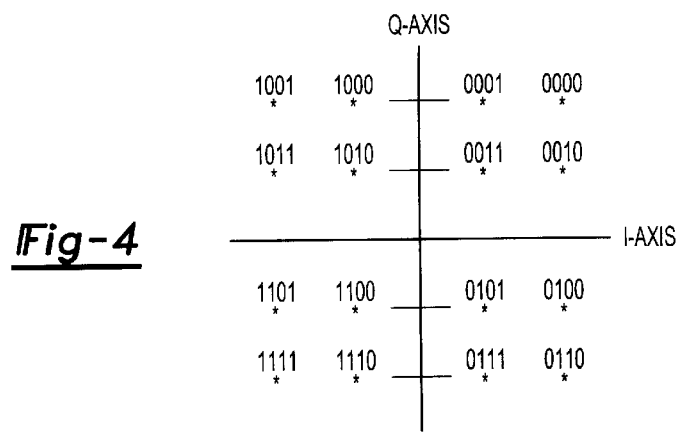
FIG. 4 is a map showing a relationship between multi-bit symbols, amplitudes and phases for a quadrature amplitude modulation concept.

The qPSK example described above, and mPSK techniques in general, assume that the amplitude of the signal stored on the medium drive remains the same, regardless of the phase shift. To further increase the storage capacity of the medium, an amplitude modulation scheme, such as a quadrature amplitude modulation (QAM) scheme, can also be incorporated into the inventive data storage method. Generally, QAM is a form of qPSK that incorporates amplitude modulation along with the phase modulation described above. In the QAM case, the phase modulator may incorporate 4 bits/symbol to obtain 16 possible amplitude/phase state combinations for the carrier, as shown in FIG. 4. Additional bits can be incorporated into each symbol to increase the number of possible data states. For example, 64-QAM-combines 6 bits/symbol to produce 64 possible states, while 256-QAM combines 8 bits/symbol to product 256 possible states. For illustrative purposes only, the description will focus on 16-QAM, but the description is equally applicable to m-PSK and m-QAM that incorporates any number of phase and/or amplitude states. Furthermore, other amplitude modulation techniques can be applied in conjunction with any phase shift keying technique without departing from the spirit of the invention.

Figure 5:
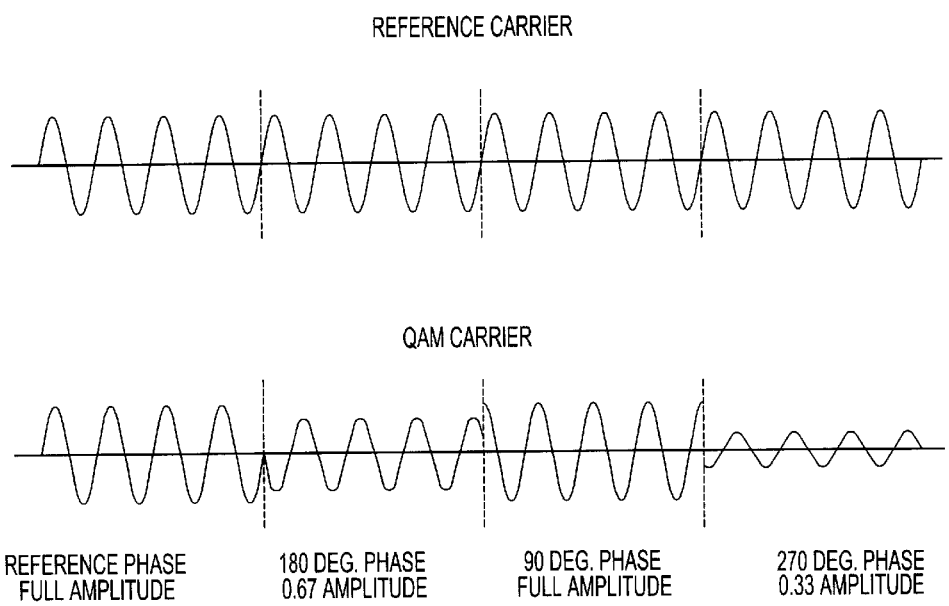
FIG. 5 illustrates waveforms generated by quadrature amplitude modulation.

FIG. 5 illustrates a comparison between a reference signal with constant amplitude, frequency and phase with a QAM signal having a constant frequency but a varying amplitude and phase. Note that in the QAM signal, both the phase and the amplitude may change while the frequency remains constant.

Figure 6:
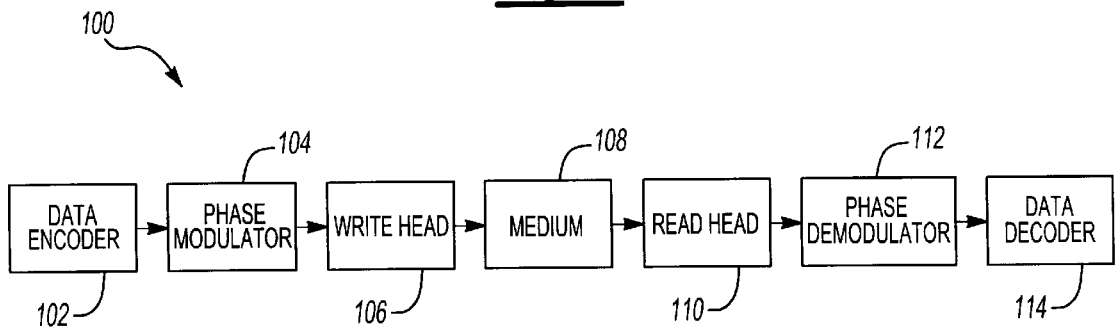
FIG. 6 is a block diagram illustrating the operation of one embodiment of the invention.

FIG. 6 is a representative block diagram illustrating the flow of information on a system incorporating the invention. A system 100 incorporating the inventive concepts would include components selected from a data encoder 102, a phase modulator 104, a write head 106, the recording medium itself 108, a read head 110, a demodulator 112, and a data decoder 114. Note that a given system 100 does not need to include all of these components and can instead contain only components directed to either a read operation or write operation. Further, the medium 108 itself does not need to be incorporated in the system 100. The examples described herein focus on symbols containing two or four bits, but any number of bits can be grouped together for each symbol without departing from the scope of the invention. The data encoder 102 converts a serial bit into a parallel bit stream and feeds the parallel bit stream to a modulator 104. For example, in a qPSK application, the data encoder 102 will take the "0" and "1" bits from the serial bit stream and group them into two-bit symbols (e.g., from a "0" and a "1" to a "01") before sending the symbols to the modulator 104.

The modulator 104 in the inventive system allows more information to be stored on the recording medium 108 in the same number of flux changes as conventional data storage methods by correlating the multi-bit symbol with more than two signal states. More particularly, because the modulator 104 receives multiple-bit symbols as input data instead of single bits, the modulator 104 does more than simply create transitions/discontinuities between the "1" state and the "0" states. Instead, the modulator 104 also accommodates the four possible bit combinations of the two-bit symbol.

The specific number of individual modulators in the modulator 104 will depend on the number of states used to represent the data. For example, if qPSK is used to store the data, the modulator 104 has four individual modulators corresponding to the four possible phase states of the data. In this case, the modulator 104 may include separate individual modulators that respectively modulate the in-phase and quadrature phase portions of the signal. For example, symbols having "0" as a first bit can be sent to one individual modulator, while symbols having "1" as a first bit can be sent to the other individual modulator. Each individual modulator then modulates its respective in-phase or quadrature phase signal into one of two phases according to the second bit in the two-bit symbol to obtain one of the four possible phase states.

In the QAM case, the modulator 104 may include sixteen individual modulators, with half allocated to the in-phase portion of the signal and half allocated to the quadrature phase portion. For example, the in-phase modulators may receive symbols having "00" and "01" as the first two bits, while the quadrature-phase modulators may receive symbols having "10" and "11" as the first two bits. Each individual modulator then varies the phase and/or amplitude of its respective signal based on the remaining bits in the symbol to obtain one of the possible amplitude/phase states (in the QAM example, one of 16 possible states). Of course, the specific number of individual modulators in the modulator 104 may vary and operate differently than the examples described above, depending on the specific number of bits used in each symbol and the number of available phase states. For example, the number of bits per symbol can be increased to obtain more states; the result would be additional phase states and/or smaller discrete amplitude steps.

The modulator 104 then adds the modulated signals together to obtain a resultant qPSK or QAM write signal and outputs the write signal to the write head 106, which responds to the signal by passing current through a coil in the write head to generate a magnetic field and magnetize the medium using known techniques, such as reversing or maintaining the magnetization of each cell on the medium 108. Note that the medium 108 itself can be isotropic or anisotropic, but if the medium 108 is anisotropic, it should be predictable and recoverable.

To conduct a read operation, the read head 110 reads the multi-bit symbols from the medium 108 and transmits the symbols to the demodulator 112. The demodulator 112 converts the multi-bit symbols obtained by the read head 110 into a parallel bit stream and transmits the parallel bit stream to the data decoder 114. The data decoder 114 converts the parallel bit stream into a serial bit stream. For example, in the two-bit symbol case, the data decoder 114 would take a "10" symbol read by the read head 110 and output as a "1", then a "0" in the serial bit stream. Because the transmitted signal for a qPSK system can be viewed as the sum of two bPSK signals in quadrature, the demodulator 112 acts as if it contained two bPSK receivers, one for each quadrature carrier.

The invention therefore increases the rate at which data is physically read from the medium and transferred to an internal drive cache or a read buffer before the data is sent over an external interface to a computer system for processing. The data transfer rate depends on the spindle speed, which is the rate at which the medium 108 rotates, the location of the track on the medium 108, and the number of bits per inch (BPI) on a track in the medium 108. The data transfer rate is usually determined in a formula based on the number of sectors per track, where the size of each sector is assumed to be fixed to have a given data capacity (e.g., 512 bytes). More particularly, the data transfer rate can be calculated by multiplying the spindle speed by the number of sectors per track and dividing the result by a constant number corresponding to the following formula:

$$\text{DTR (bytes/s)} = \text{spindle speed (revolutions/s)} * \text{SPT} * \text{bytes/sector} \quad (1)$$

The invention increases the number of bits per inch by allowing each symbol to represent more than one bit, thereby introducing the possibility that the number of bits per symbol will be greater than one. Because the size of each sector is normally fixed, the number of sectors per track will increase proportionally as the number of bits per symbol increases. This in turn will cause the data rate to increase proportionally with the number of bits per symbol, without having to modify the number of bits per inch or the spindle speed.

These changes include new encoding schemes, potentially different forward error correction codes, and adding a third dimension to tools such as run length limiting (RLL) and partial response, maximum likelihood (PRML).

Thus, rather than focusing on improving storage medium integrity to store symbols closer together, the inventive method and system focuses on increasing the number of bits per symbol to increase storage capacity. To optimize storage capacity, the medium used in the invention has high integrity and a high-signal to noise ratio so that the multi-bit symbols can still be stored close together without being affected by inter-symbol and/or inter-track interference.

Note that alternative embodiments of the inventive system are possible. For example, magneto-optic techniques, where an electromagnetic wave interacts with a magnetic field, can be used instead of the modulators described above to obtain phases for writing to and reading from the medium. Further, the invention can be applied to recording media that store data at different depths within the medium.

While the invention has been specifically described in connection with certain specific embodiments thereof, it is to be understood that this is by way of illustration and not of limitation, and the scope of the appended claims should be construed as broadly as the prior art will permit.

What is claimed is:

1. An apparatus for writing data to a medium that can store a plurality of symbols, comprising:
   a data encoder that receives serial data in a serial digital bit stream as an input and converts the serial data to parallel data and outputs a digital parallel bit stream comprising said parallel data;
   a modulator that receives the parallel data from the data encoder; and
   a write head responsive to the modulator for writing at least two bits per symbol on the medium based on the parallel data.

2. The apparatus of claim 1, wherein the modulator modulates at least one of a phase and an amplitude of a write signal corresponding to each symbol based on the parallel data and outputs the modulated write signal to the write head to write said at least two bits per symbol on the medium based on the modulated write signal.

3. The apparatus of claim 2, wherein the bits in each symbol written by the write head correspond with a modulated phase.

4. The apparatus of claim 3, wherein the modulator determines the modulated phase corresponding to a given symbol with respect to the phase corresponding to a previous symbol.

5. The apparatus of claim 2, wherein the bits in the symbol written by the write head correspond with a modulated amplitude.

6. The apparatus of claim 5, wherein the bits in each symbol written by the write head correspond with the modulated amplitude and a modulated phase.

7. An apparatus for reading data from a medium having a plurality of symbols, wherein at least one of the plurality of symbols contains at least two bits per symbol, comprising:
   a read head that reads one of the symbols from the medium;
   a demodulator that converts the symbol read by the read head into parallel digital data; and
   a data decoder that receives the parallel digital data as an input and converts the parallel data to a serial bit stream of digital data.

8. The apparatus of claim 7, wherein the demodulator detects at least one of a phase and an amplitude of a read signal corresponding to the symbol by the read head and outputs the parallel data based on the read signal to the data decoder.

9. The apparatus of claim 8, wherein the demodulator detects the phase corresponding to a given symbol with respect to the phase corresponding to a previous symbol.

10. An apparatus for reading and writing data to a medium, comprising:
    a data encoder that receives serial data in a digital serial bit stream as an input and converts the serial data to parallel data in a digital parallel bit stream;
    a modulator that receives the parallel bit stream from the data encoder;
    a write head responsive to the modulator for writing a symbol containing at least two bits per symbol on the medium based on the parallel data;
    a read head that reads the symbol from the medium;
    a demodulator that converts the symbol read by the read head into parallel data in a parallel digital bit stream; and
    a data decoder that receives the parallel digital bit stream as an input and converts the parallel digital bit stream to a serial digital bit stream of serial data.

11. The apparatus of claim 10, wherein the modulator modulates at least one of a phase and an amplitude of a write signal corresponding to each symbol based on the parallel data and outputs the modulated write signal to the write head to write said at least two bits per symbol on the medium.

12. The apparatus of claim 11, wherein the bits in the symbol written by the write head correspond with a modulated phase.

13. The apparatus of claim 12, wherein the modulator determines the modulated phase corresponding to a given symbol with respect to the phase corresponding to a previous symbol.

14. The apparatus of claim 11, wherein the bits in the symbol written by the write head correspond with a modulated amplitude.

15. The apparatus of claim 14, wherein the bits in the symbol written by the write head correspond with the modulated amplitude and a modulated phase.

16. The apparatus of claim 10, wherein the demodulator detects at least one of a phase and an amplitude of a read signal corresponding the symbol and outputs the parallel data based on the read signal to the data decoder.

17. The apparatus of claim 16, wherein the demodulator detects the phase corresponding a given symbol with respect to the phase corresponding to a previous symbol.

18. A method for writing data to a medium, comprising:
converting a serial digital bit stream of data to a parallel digital bit stream of data; and
writing at least two bits per symbol on the medium based on the parallel digital bit stream of data.

19. The method of claim 18, further comprising:
modulating the parallel data to obtain a write signal; and
writing said at least two bits per symbol on the medium based on the write signal.

20. The method of claim 18, wherein the writing act includes writing the bits in each symbol to correspond with a modulated phase.

21. The method of claim 20, wherein the modulated phase corresponding a given symbol is determined with respect to the phase corresponding to a previous symbol.

22. The method of claim 18, wherein the bits in each symbol correspond with a modulated amplitude.

23. The method of claim 22, wherein the bits in each symbol correspond with the modulated amplitude and a modulated phase.

24. A method for reading data from a medium having a plurality of symbols, wherein at least a portion of the symbols represent at least two bits per symbol, comprising:
reading one of said plurality, symbol from the medium;
converting the symbols. into parallel data;
outputting a digital parallel bit stream comprising said parallel data; and
converting the parallel bit stream to a digital serial bit stream comprising serial data and outputting said serial bit stream.

25. The method of claim 24, further comprising the acts of:
detecting at least one of a phase and an amplitude of a read signal corresponding to the symbol; and
outputting the parallel data based on the read signal.

26. The method of claim 25, wherein the phase corresponding a given symbol is based on a phase corresponding to a previous symbol.

27. A computer system comprising a hard drive and a system for storing data on said hard drive, said system comprising:
said hard drive;
a data encoder that receives data to be stored on said hard drive and outputs said data in parallel;
a modulator that receives the parallel data from the data encoder; and
a write head responsive to the modulator for writing symbols on the hard drive based on the parallel data, wherein each symbol represents at least two bits of said parallel data.

28. The system of claim 27, wherein said data received by said data encoder is serial data in a serial digital bit stream and said encoder converts the serial data to said parallel data.

29. The system of claim 27, further comprising:
a read head that reads the symbols from the hard drive; and
a demodulator that converts the symbols read by the read head into a parallel bit stream.

30. The system of claim 29, further comprising a data decoder that receives the parallel bit stream from the demodulator and converts the parallel bit stream into a serial bit stream of digital data.

31. The system of claim 27, wherein the modulator modulates at least one of a phase and an amplitude of a write signal corresponding to each symbol based on the parallel data and outputs the modulated write signal to the write head to write said at least two bits per symbol on the hard drive.

32. The system of claim 31, wherein the bits in the symbol written by the write head correspond with a modulated phase.

33. The system of claim 32, wherein the modulator determines the modulated phase corresponding to a given symbol with respect to the phase corresponding to a previous symbol.

34. The system of claim 31, wherein the bits in the symbol written by the write head correspond with a modulated amplitude.

35. The system of claim 34, wherein the bits in the symbol written by the write head correspond with the modulated amplitude and a modulated phase.

36. The system of claim 29, wherein the demodulator detects at least one of a phase and an amplitude of a read signal corresponding,the symbol and outputs the parallel bit stream based on the read signal to the data decoder.

37. The system of claim 36, wherein the demodulator detects the phase corresponding a given symbol with respect to the phase corresponding to a previous symbol.

38. A method of storing data on a drive of a computer system comprising:
converting digital data to a parallel digital bit stream of data; and
writing symbols on a disk in said drive of said computer system,
wherein each symbol represents at least two bits of the data in said parallel digital bit stream of data.

39. The method of claim 38, further comprising modulating a write signal in accordance with the data of the parallel digital bit stream.

40. The method of claim 39, wherein the modulating includes modulating a phase of the write signal in accordance with the data of the parallel digital bit stream.

41. The method of claim 40, wherein a modulated phase corresponding a given symbol is determined with respect to a phase corresponding to a previous symbol.

42. The method of claim 39, wherein the modulating includes modulating an amplitude of the write signal in accordance with the data of the parallel digital bit stream.

43. The method of claim 39, wherein the bits represented by each symbol correspond with a modulated amplitude and a modulated phase of the write signal that wrote that symbol.

44. The method of claim 38, further comprising:
reading one of said symbols from the disk; and
converting each symbol into parallel data and outputting a parallel bit stream of said parallel data.

45. The method of claim 44, further comprising converting the parallel bit stream to a digital serial bit stream comprising serial data.

46. The method of claim 38, wherein said drive is a hard drive of said computer sytem.

* * * * *

UNITED STATES PATENT AND TRADEMARK OFFICE
CERTIFICATE OF CORRECTION

PATENT NO. : 6,735,028 B1
DATED : May 11, 2004
INVENTOR(S) : Keith Alan Rothschild and John J. Ernandez, Sr.

It is certified that error appears in the above-identified patent and that said Letters Patent is hereby corrected as shown below:

Column 8,
Line 28, change "signal corresponding, the symbol and outputs..." to -- signal corresponding the symbol and outputs... --.

Signed and Sealed this

Thirteenth Day of July, 2004

JON W. DUDAS
*Acting Director of the United States Patent and Trademark Office*